US006988585B2

(12) United States Patent
Mourieras et al.

(10) Patent No.: US 6,988,585 B2
(45) Date of Patent: Jan. 24, 2006

(54) SOUND INSULATION ASSEMBLY FOR MOUNTING IN A TUBULAR PART, AND A TUBULAR PART FITTED WITH SUCH ASSEMBLIES, IN PARTICULAR A MOTOR VEHICLE PART

(75) Inventors: Maxime Mourieras, Rueilmaison (FR); Gérard Aube, Sartrouville (FR)

(73) Assignee: Le Joint Francais, Paris (FR)

( * ) Notice: Subject to any disclaimer, the term of this patent is extended or adjusted under 35 U.S.C. 154(b) by 308 days.

(21) Appl. No.: 10/602,944

(22) Filed: Jun. 24, 2003

(65) Prior Publication Data

US 2004/0070232 A1   Apr. 15, 2004

(30) Foreign Application Priority Data

Jul. 3, 2002   (FR) .................................. 02 08297

(51) Int. Cl.
   *F02B 77/13*   (2006.01)
   *F02B 77/11*   (2006.01)
   *B60R 27/00*   (2006.01)

(52) U.S. Cl. .................................. 181/204; 296/187.02

(58) Field of Classification Search ................ 181/204, 181/207; 403/326, 329, 28; 24/458, 292, 24/297; 296/187.02, 901.01, 205, 187.01, 296/203.01; 428/99, 122, 139, 192, 63, 133, 428/223; 277/166, 178, 630, 645, 646, 637, 277/650, 316, 916; 180/68.5
See application file for complete search history.

(56) References Cited

U.S. PATENT DOCUMENTS

| | | | |
|---|---|---|---|
| 4,810,548 A | * | 3/1989 | Ligon et al. .................. 428/71 |
| 5,213,391 A | | 5/1993 | Takagi |
| 5,344,208 A | * | 9/1994 | Bien et al. ............. 296/187.02 |
| 5,506,025 A | * | 4/1996 | Otto et al. ..................... 428/98 |
| 5,631,027 A | * | 5/1997 | Takabatake ................. 425/4 R |
| 5,642,914 A | * | 7/1997 | Takabatake ............ 296/187.02 |
| 5,678,826 A | * | 10/1997 | Miller ......................... 277/316 |
| 5,755,486 A | | 5/1998 | Wycech |
| 5,904,024 A | | 5/1999 | Miwa |
| 5,979,902 A | * | 11/1999 | Chang et al. ................ 277/316 |
| 6,062,624 A | * | 5/2000 | Crabtree et al. ........... 296/39.3 |
| 6,093,358 A | * | 7/2000 | Schiewe et al. ............ 264/250 |
| 6,103,341 A | * | 8/2000 | Barz et al. .................. 428/147 |
| 6,114,004 A | * | 9/2000 | Cydzik et al. ................ 428/81 |
| 6,146,565 A | * | 11/2000 | Keller ....................... 264/46.5 |
| 6,347,799 B1 | * | 2/2002 | Williams et al. ............ 277/316 |

(Continued)

FOREIGN PATENT DOCUMENTS

EP   0383498 B1   3/1993

(Continued)

*Primary Examiner*—Edgardo San Martin
(74) *Attorney, Agent, or Firm*—Alston & Bird LLP

(57) ABSTRACT

A sound insulation in tubular parts regardless of the section shape of the part, uses a piece of material that is suitable for expanding over the entire section of the section, which piece is mounted using a support suitable for fixing to the wall of the tube that is to be insulated. In a particular embodiment, a sound insulation assembly mounted in a part presenting a longitudinal direction and a tubular wall comprises a wafer that is thermally expandable to form a foam, said wafer having two parallel main faces and extending essentially along a main plane from a first wall portion towards the diametrically opposite wall portion, together with a wafer support comprising a clamp for retaining the wafer prior to expansion and coupled to fixing means in the form of a clip for fixing to the first wall portion of the part.

22 Claims, 6 Drawing Sheets

U.S. PATENT DOCUMENTS

| | | | |
|---|---|---|---|
| 6,382,635 B1 * | 5/2002 | Fitzgerald | 277/630 |
| 6,413,611 B1 * | 7/2002 | Roberts et al. | 428/99 |
| 6,455,146 B1 * | 9/2002 | Fitzgerald | 428/318.4 |
| 6,491,336 B1 * | 12/2002 | Beckmann et al. | 296/187.01 |
| 6,649,243 B2 * | 11/2003 | Roberts et al. | 428/99 |
| 6,863,338 B2 * | 3/2005 | Stahl | 296/187.02 |
| 2004/0201258 A1 * | 10/2004 | Daniere et al. | 296/203.02 |
| 2004/0239148 A1 * | 12/2004 | Ratet | 296/187.02 |

FOREIGN PATENT DOCUMENTS

EP    0730999 A1    9/1996

* cited by examiner

SOUND INSULATION ASSEMBLY FOR MOUNTING IN A TUBULAR PART, AND A TUBULAR PART FITTED WITH SUCH ASSEMBLIES, IN PARTICULAR A MOTOR VEHICLE PART

The invention relates to a sound insulation assembly for mounting in a tubular part, and to a tubular part fitted with at least one such assembly, in particular a motor vehicle bodywork part.

BACKGROUND OF THE INVENTION

Motor vehicle bodywork, in particular in its body, includes parts that are tubular, in particular door and window bay risers, side rails, etc., which tubular parts constitute significant paths for propagating a variety of noises into the vehicle cabin, thereby reducing passenger comfort.

Providing sound insulation for such tubular parts thus raises a problem since such parts are of a variety of shapes and of varying section, and may themselves be constituted by assembling together a plurality of pieces.

In order to avoid noise propagation, motor vehicle manufacturers have, for a long time, been in the practice of closing the inside section of such tubular parts by locally injecting a composition that expands chemically and that serves to create a foam plug which comes into contact with the inside wall of such parts and which forms at least one sound insulating partition.

Foam is injected through a hole in the part, after the vehicle body has been painted. This solution applies when the part(s) (or the portion of a part) in which it is desired to provide a partition is itself a tube of right section that is substantially circular, and of diameter that is relatively small.

However, that solution requires the use of special equipment for injecting the foam.

Document U.S. Pat. No. 5,642,914 discloses a sound insulation device comprising a material that is expanded by applying heat and which is generally in the form of a flat ring that is fitted around the periphery of a partitioning insert. The ring is obtained by extrusion or by molding so as to give it the shape of the outline of the partitioning insert.

Document WO 01/83206 discloses a sound insulation device in which the thermally expandable material is molded on the periphery of a partitioning insert or is present in the form of a strip or a bead which is fixed to the periphery of said insert by adhesive or by means of staples.

OBJECTS AND SUMMARY OF THE INVENTION

The invention seeks to solve the problem of providing sound insulation for tubular parts regardless of the shape of the section of the part that is to be insulated, and without requiring the use of an insert of relatively high cost. In addition, placing a bead around the insert requires additional installations to be provided, and thus leads to extra costs.

To this end, the invention proposes using a piece of material that is suitable for expanding over the entire cross-section, and that is mounted on a support that can be fixed to a wall of the tube that is to be insulated.

More precisely, the invention provides a sound insulation assembly for mounting in a part presenting a longitudinal direction and a tubular wall. It comprises a foam, suitable for filling the through section of the part.

Advantageously, this piece is in the form of a wafer presenting two parallel main faces and extending substantially in a main plane from a first wall portion towards the diametrically opposite wall portion, preferably about one-fourth to about one-half of the distance between the two portions, together with a wafer support comprising means for retaining the wafer before expansion coupled to means for fixing to the first wall portion of the part.

Advantageously, the expandable wafer is obtained by being cut out from a plate made by extruding a filler composition based on vulcanizable synthetic rubber of the butyl and/or halogenated butyl or nitrile type, of polychloroprene, of ethylene-propylene diene monomer (EPDM) for example, and a swelling agent, it being understood that it is also possible to vary the expansion or swelling ratio of the wafer on a case-by-case basis as a function of the space to be filled in the tubular part by varying the proportions of the ingredients in the filler. The expansion ratio lies in the range 200% to 300% in the main plane, and 400% to 600% in a direction orthogonal thereto.

In particular embodiments, with the wafer mounted across the tubular part or longitudinally along the axis of said part:

the fixing means are formed by a plate for clipping, for crimping, or for sticking against the inside wall of the tubular part, the fixing means are formed by a clip constituted by at least one support arm terminated by flexible tabs, the clip being engaged through an opening formed in the wall of the tubular part;

the retaining means are constituted by a clamp constituted by hooks that penetrate into the wafer, by resilient blades that pinch the faces of the wafer, or indeed by clip means similar in shape to the clip of the fixing means;

the hooks or resilient blades of the clamp are disposed in alternation on either side of the wafer;

the coupling between the retaining means and the fixing means is obtained by a connection gutter when said retaining means are constituted by flexible blades, or by support forks when the retaining means are constituted by hooks or by clips mounted on such forks;

mounting polarization is provided when the fixing means and the retaining means are constituted by two clip means, such polarization consisting in making the retaining clips of dimensions that are considerably smaller than those of the fixing clips, possibly together with a connection rod having a dimension, e.g. a diameter or a side, that is considerably smaller than that of the arm of the fixing clip;

the wafer support is formed by a strip of adhesive having the same ingredients as the expandable wafer, together with a phenolic type resin or the equivalent, e.g. an epoxy resin, the ingredients being taken in proportions that are suitable for forming a flexible material capable of adhering both to the expandable wafer and to the inside face of the wall of the tubular part; and the adhesive strip either has a T-shape by being folded onto itself, the expandable wafer being stuck to the foot of the T-shape, or being engaged in said foot, or else it is in the form of an angle bracket, and adhesive is applied between the wafer and preferably one or two brackets, or else it has the shape of a plate so as to form a junction between the expandable wafer and the wall of the part, with or without studs of expandable material for consolidating retention of the wafer on the adhesive plate.

In general, the wafer is in the form of a disk or a rectangle of diameter or size that is equal to about half that of the tubular part.

In other embodiments, the wafer support is made by molding a metal preform or by injection molding a thermoplastic material. Under such circumstances, the retaining means and the fixing means are integrally molded with the connection elements.

A sound insulation assembly of the invention also provides the advantage of not requiring an inflatable filler to be deposited on an insert.

The invention also provides a tubular part, in particular a motor vehicle bodywork part, fitted with at least one sound insulation assembly having all or some of the above-specified characteristics, the wafer being caused to expand by heating while the part is being painted.

BRIEF DESCRIPTION OF THE DRAWINGS

Other advantages, characteristics, and details of the invention appear from the additional description below given with reference to the accompanying drawings, themselves given purely by way of example and in which.

MORE DETAILED DESCRIPTION

Identical reference signs are used to designate objects that are identical in the various figures.

Figure 1:
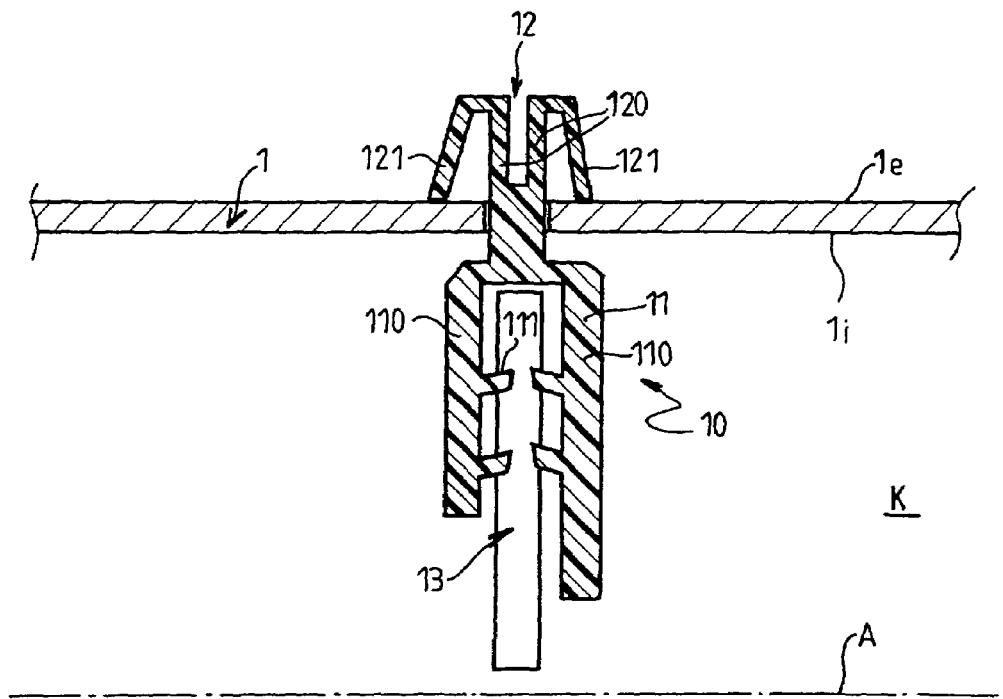
FIG. 1 is a diagrammatic longitudinal section view of a first embodiment of a sound insulation assembly in accordance with the invention and located inside a tube, the assembly comprising in particular a retaining clamp having hooks and a fixing clip.
Figure 1:
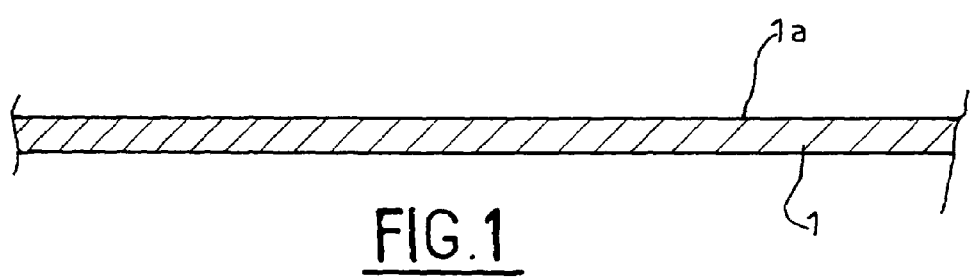

A first embodiment of a sound insulation assembly 10 of the invention is shown in FIG. 1. This figure is a diagrammatic longitudinal section view along a tube K forming part of a vehicle body and having a section that is substantially square with a side of about 10 centimeters (cm).

The assembly is mounted inside the tube K of longitudinal axis A, and it comprises in particular a retaining clamp 11 and a fixing clip 12 engaging the sheet metal wall 1 of the tube. The clamp comprises two branches 110 of a fork, each branch carrying hooks 111 which penetrate into the faces of a piece of thermally expandable material in the form of a wafer 13 in this embodiment. The hooks and the clips may be integrally molded with the clamp and disposed in such a manner as to enable unmolding to be performed without any undercut problems.

The clamp may be made of a thermoplastic material that is sufficiently rigid to position and hold the wafer 13 in place. This material may be constituted, for example, by polyamide, polystyrene, or polypropylene.

The material that is suitable for expanding thermally may be a compound of vulcanizable synthetic rubber of the butyl, halogenated butyl, or nitril type, for example a polychloroprene or an ethylene-propylene diene terpolymer (EPDM), in which a swelling agent has been added in order to form a filler. The quantity of swelling agent is a function of the desired expansion ratio. Expansion at a temperature of about 150° C. to 200° C. takes place only subsequently, during the operation of painting the vehicle body. In this example, the desired expansion ratio is about 100% to 1000%, and preferably 300% to 500%.

The piece 13 is obtained by being cut out from a plate that is made by extruding the filler in the form of a section member of shape adapted to the shape of the section of the parts that are to receive it, for example cylindrical or rectangular. In the example, the wafer is in the form of a square that is about 5 millimeters (mm) thick and that has a side equal to about 4 cm.

The clamp 11 is held to the wall 1 by the fixing clip 12 formed by a pair of center arms 120 extended by two flexible tabs 121. The clip 12 passes through the wall 1 via an opening 2 previously formed in the sheet metal which is about 0.8 mm thick, and then the tabs 121 deploy elastically against the outside face 1e of the wall 1. The pair of center arms provide a connection between the branches 110 of the clamp and the tabs 121 of the clip, so that the branches start from about 1 mm to 2 mm away from the inside face 1i of the wall 1.

Figure 2:
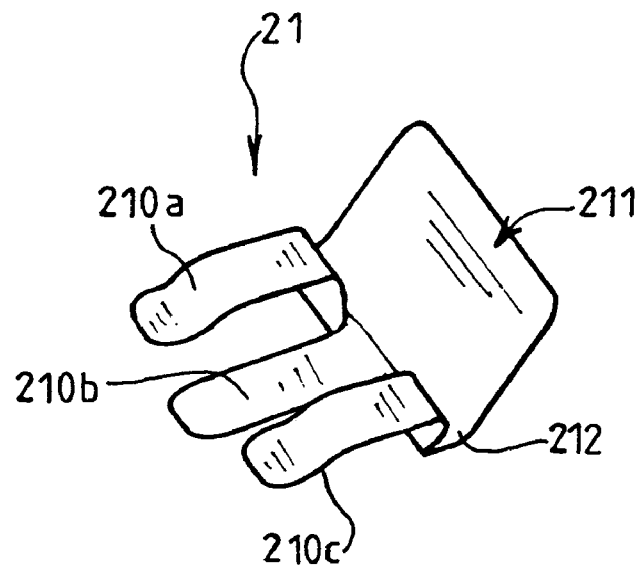
FIG. 2 is a perspective view of a second embodiment comprising a retaining clamp with blades and a fixing plate.

In a variant embodiment, as shown in the perspective view of FIG. 2, the wafer is held by a clamp 21 having three resilient blades 210a to 210c disposed on opposite sides of the expandable wafer, and extended by a fixing plate 211 suitable for being clipped, stuck, or crimped onto the wall 1. The connection between the blades and the plate is formed by a gutter 212.

Figure 3:
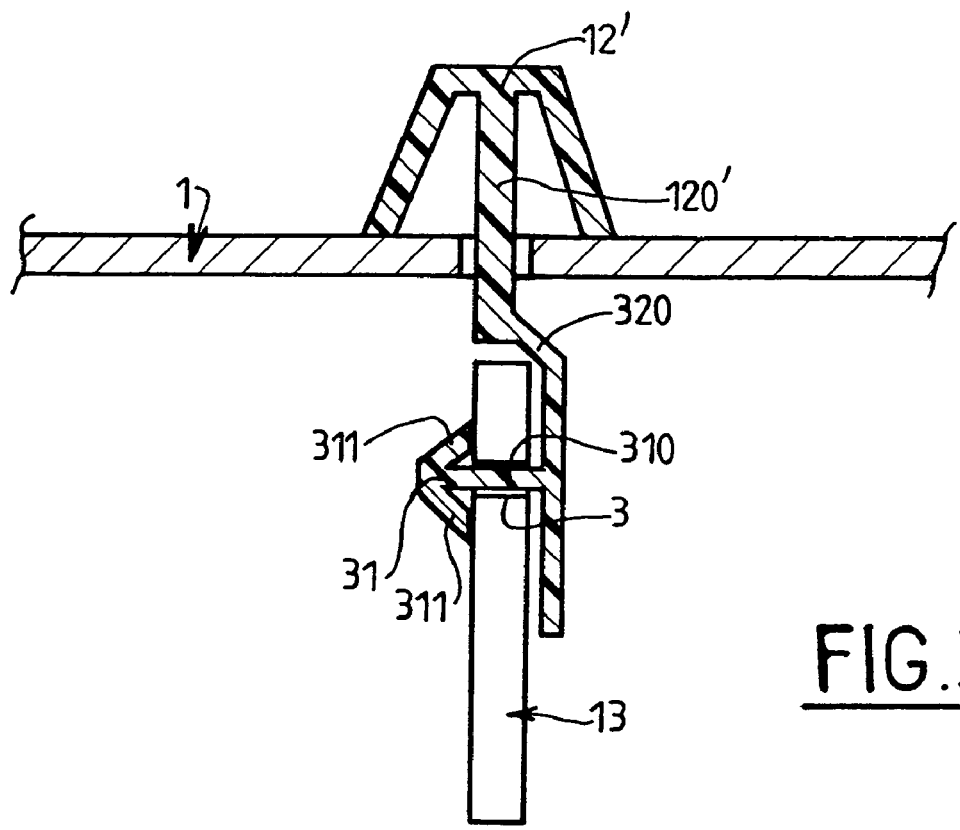
FIG. 3 is a diagrammatic longitudinal section view of an assembly comprising retaining means and fixing means both constituted by clips.
Figure 4:
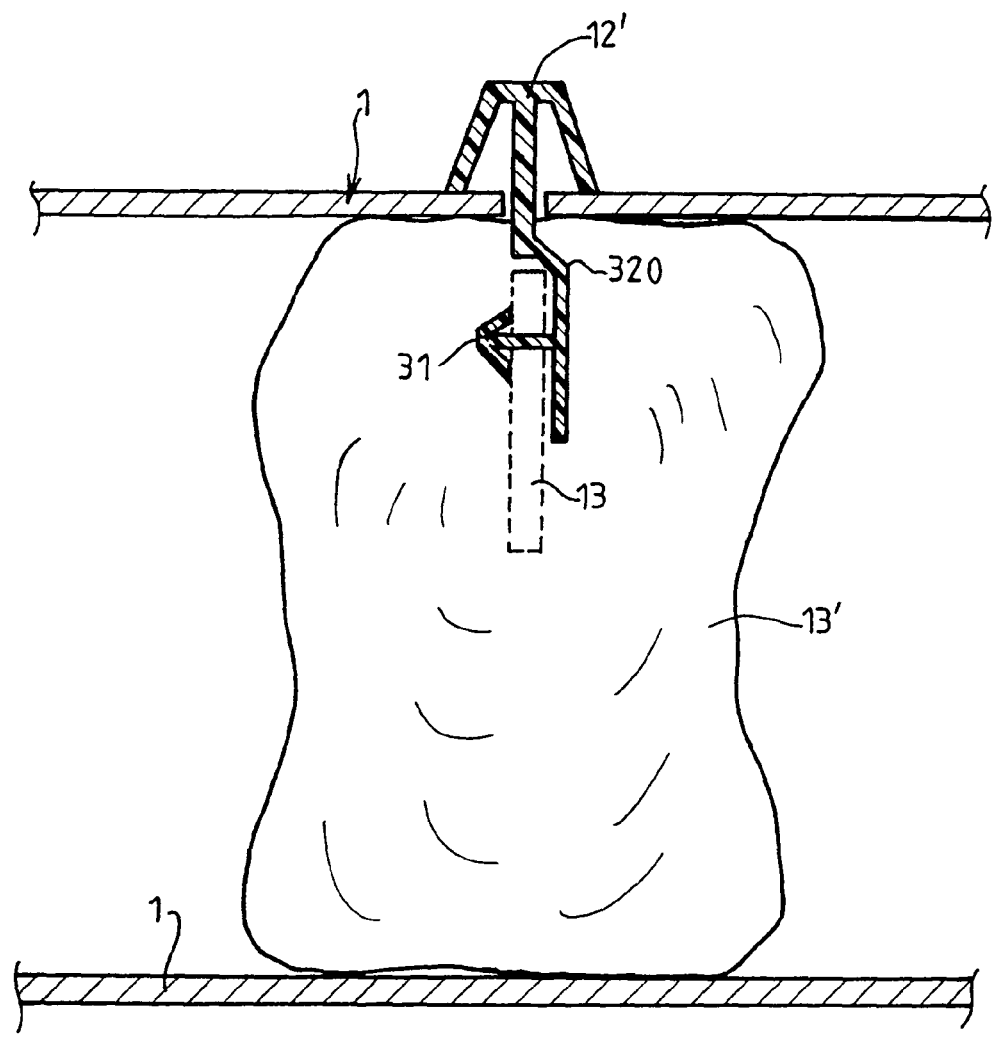
FIG. 4 is a view analogous to FIG. 3, after the wafer has expanded.

In another example, the retaining means are formed by a clip 31 as shown in the diagrammatic longitudinal section view prior to expansion of FIG. 3, and as shown in FIG. 4 after the wafer 13 has expanded to 13'. The retaining clip is formed in a similar manner to the fixing clip 12, but is considerably smaller in structure and dimensions, both concerning its central axis 310 which is formed by a single arm, and concerning its flexible tabs 311. The retaining clip passes through an opening 3 formed in the wafer 13. In this example, the fixing means are constituted by a clip 12' of dimensions equivalent to those of the fixing clip 12, but of simplified structure concerning its central arm 120', since this arm no longer has to carry two fork branches as in the preceding example, but only a single connection rod 320 of a size that is considerably smaller than that of the central arm.

Figure 5:
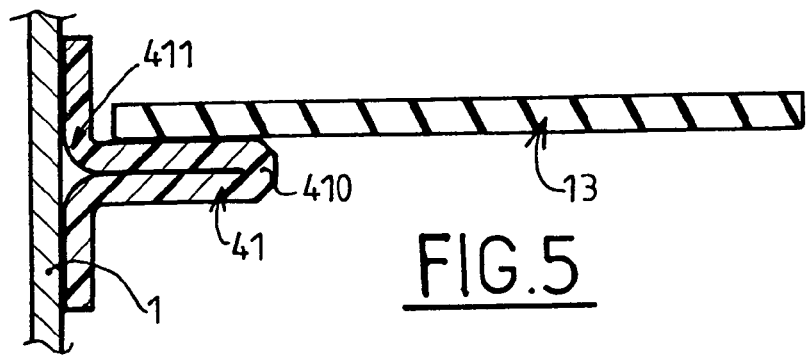
FIG. 5 is a longitudinal section view of an example of a support formed by a strip of adhesive folded into a T-shape with the wafer stuck thereto.

In another embodiment, as shown in longitudinal section view in FIG. 5, the fixing and retaining means are constituted by a single support. This support comprises an adhesive strip 41 that is folded to form a T-shape comprising a foot 410 and a head 411. The wafer 13 is stuck directly to one of the faces of the foot 410. The head 411 adheres to the inside face 1i of the wall 1.

The adhesive comprises the same ingredients as the wafer 13 either in identical proportions or, advantageously, in proportions that are adapted to obtain stiffness that is greater than that of the wafer and high adhesive power.

Figure 6:
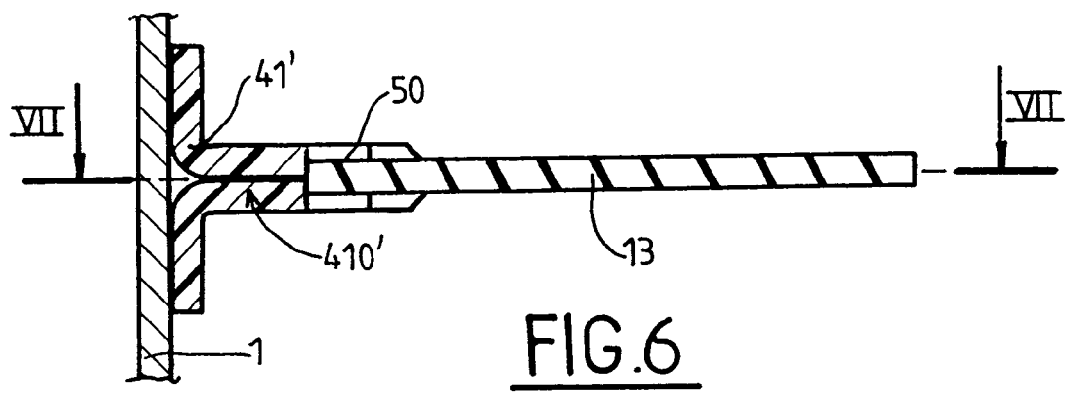
FIGS. 6 and 7 are a diagrammatic longitudinal section view of an example of a support together with a cross-section view on plane VII—VII of FIG. 6, showing a variant of the preceding example in which the wafer is engaged in the T-shape.
Figure 7:
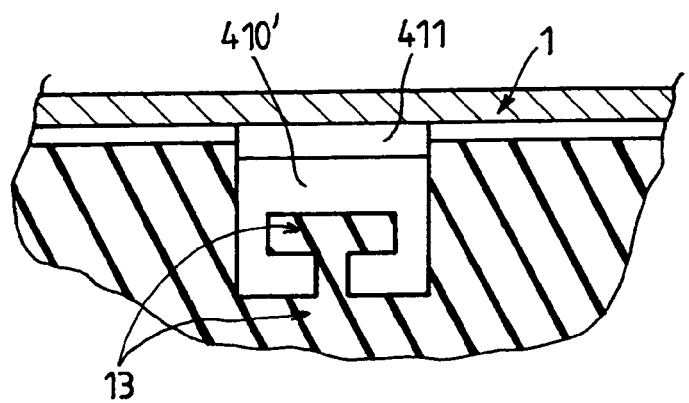

In a variant, shown respectively in longitudinal and cross-section views in FIGS. 6 and 7, the wafer 13 is received in the foot 410' of the support 41'. An orifice 50 (FIG. 7) that is likewise T-shaped or the equivalent (e.g. star-shaped) is punched out of the foot 410 and the wafer 13 is engaged therein. Any other shape enabling a secure engagement to be obtained, such as a dovetail or a star could naturally also be envisaged.

Figure 8A:
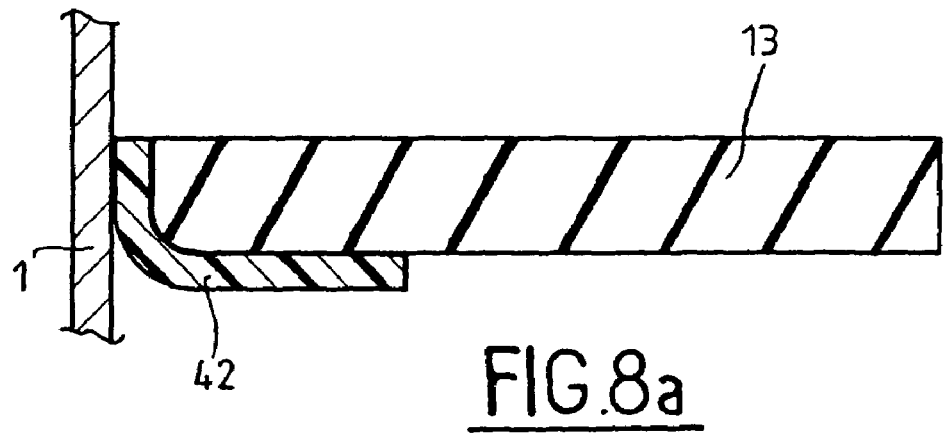
FIGS. 8a and 8b are longitudinal section views showing another embodiment of an assembly of the invention using one or two angle brackets made of adhesive strip.

In another variant embodiment, the adhesive strip is shaped merely as an angle bracket 42 (FIG. 8a) folded over the wafer 13 covering part of a side face 13f and an edge face 13e of the wafer. The longer linear portion 420 of the bracket supports the wafer and its other linear portion 421 adheres to the end thickness 13e and to the inside face 1i of the wall 1. A chamfer 130 is formed in one of the edges of the wafer 13 so as to match the curved shape of the connection between the linear portions of the bracket-shaped strip.

Figure 8B:
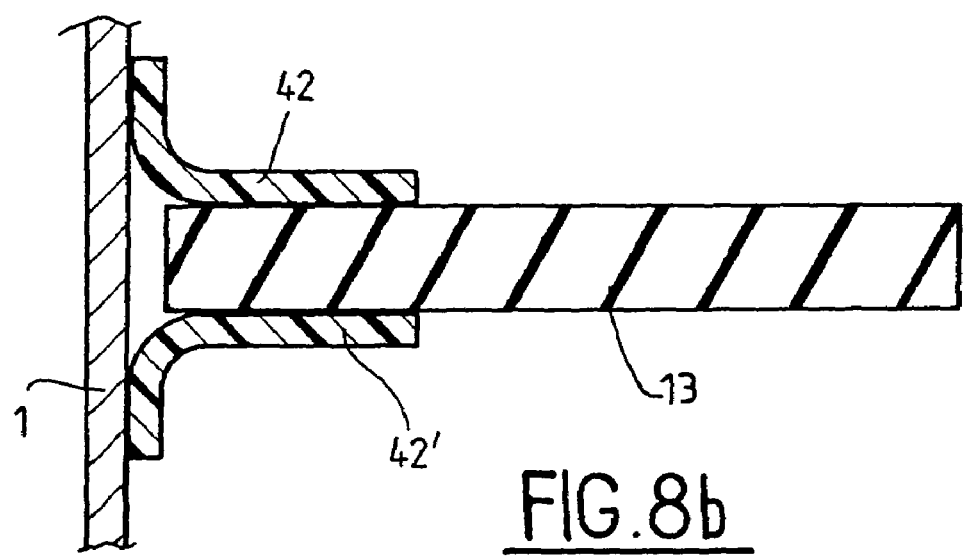

Alternatively (FIG. 8b), two brackets 42 and 42' identical to the preceding bracket are sandwiched on either side of the wafer 13 with their longer linear portions 420 adhering to the wafer 13 and their shorter linear portions 421 adhering to the wall 1.

Figure 9:
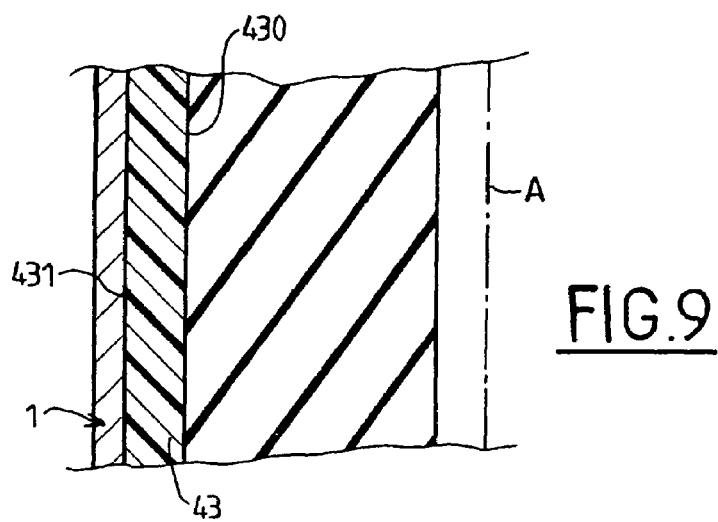
FIG. 9 is a longitudinal section view of an example of a support formed by a longitudinal adhesive plate.

In another embodiment, shown in FIG. 9, the adhesive strip is present along the axis A of the tube K in the form of a rectangular plate 43. One face 430 of the plate adheres to the expandable wafer 13 that also extends longitudinally, and the other face 431 adheres to the inside face 1i of the wall 1.

Figures 10, 11:
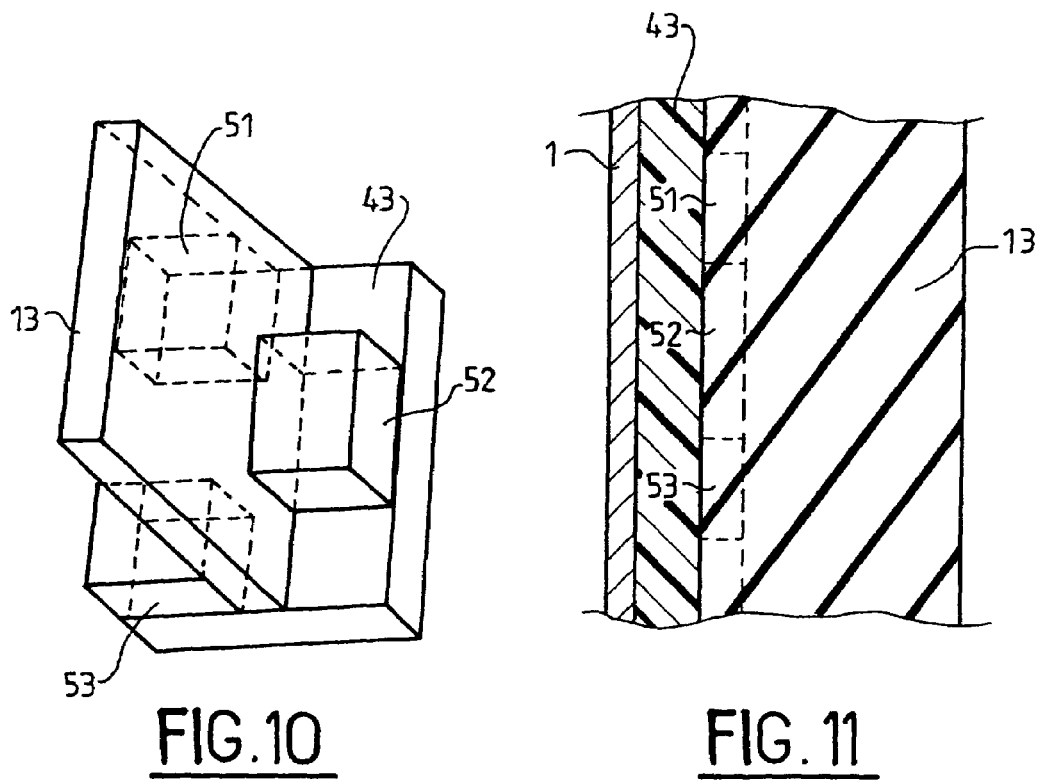
FIGS. 10 and 11 are a perspective view and a longitudinal section view of an example of an expandable wafer consolidated by support studs.

In a variant of the preceding solution, and as shown in FIGS. 10 and 11, which are respectively a perspective view and a longitudinal view, the expandable wafer 13 is consolidated by two studs of expandable material in the form of dice 51 to 53 stuck to the adhesive strip 43 so as to hold the wafer 13 in position.

The invention is not limited to the embodiments described and shown. For example, it is possible to provide the piece of expandable material in a wide variety of shapes, for example it may have longitudinal and/or transverse projections. The clips may have some number of arms or tabs that is greater than 2, and may be in a variety of shapes, for example blades that are curved and flexible for the purpose of performing clip fastening. In addition, it should be observed that the expansion or swelling ratio of the plate is a function of the space that it is to fill and that can vary from one part to another with assembly tolerances that are critical to a greater or lesser extent.

What is claimed is:

1. A sound insulation assembly for mounting in a part presenting a longitudinal direction and a tubular wall, the assembly comprising:
   a piece of material that is thermally expandable to form a foam, suitable for filling the through section of the part; and
   a support comprising:
      retaining means for retaining said piece of expandable material prior to expansion; and
      fixing means for fixing to a first wall portion of the part and coupled to said retaining means;
   wherein said piece of expandable material is shaped in the form of a wafer presenting two parallel main faces and extending essentially in a main plane away from the first wall portion towards the diametrically opposite wall portion, and wherein said support allows said wafer to expand in all directions.

2. A sound insulation assembly according to claim 1, in which the wafer extends essentially to about one-fourth to about one-half the distance between the two diametrically opposite wall portions.

3. A sound insulation assembly according to claim 2, in which the wafer is mounted either across the tubular part or longitudinally along the axis of said part.

4. A sound insulation assembly according to claim 1, in which the fixing means are formed by a plate for clipping, for crimping, or for sticking against the inside wall of the tubular part.

5. A sound insulation assembly according to claim 4, in which the retaining means are constituted by a clamp formed by resilient blades for clamping against the faces of the wafer.

6. A sound insulation assembly according to claim 5, in which the coupling between the retaining means and the fixing means is formed by a connection gutter.

7. A sound insulation assembly according to claim 1, in which the fixing means are formed by a clip constituted by at least one support arm terminated by flexible tabs, the clip being engaged through an opening formed in the wall of the tubular part.

8. A sound insulation assembly according to claim 7, in which the retaining means are constituted by a clamp having hooks which penetrate into the wafer.

9. A sound insulation assembly according to claim 7, in which the retaining means are constituted by clip means similar in shape to the fixing means.

10. A sound insulation assembly according to claim 5, in which the resilient blades and the hooks of the clamp are disposed in alternation on either side of the wafer.

11. A sound insulation assembly according to claim 8, in which the coupling between the retaining means and the fixing means is formed by support fork branches, the hooks and the retaining clips being mounted on said fork branches.

12. A sound insulation assembly according to claim 9, in which assembly polarization is provided between the retaining means and the fixing means, by making the retaining clip of dimensions that are significantly smaller than those of the fixing clips.

13. A sound insulation assembly according to claim 12, in which a connection rod is provided between the retaining and fixing clips, the retaining rod being of dimensions considerably smaller than those of the arm of the fixing clip.

14. A sound insulation assembly according to claim 1, in which the wafer support is made by molding a metal preform.

15. A sound insulation assembly according to claim 1, in which the wafer support is made by injection molding a thermoplastic material.

16. A sound insulation assembly for mounting in a part presenting a longitudinal direction and a tubular wall, the assembly comprising:
   a piece of material that is thermally expandable to form a foam, suitable for filling the through section of the part; and
   a support comprising:
      retaining means for retaining said piece of expandable material prior to expansion; and
      fixing means for fixing to a first wall portion of the part and coupled to said retaining means;
   wherein said piece of expandable material is shaped in the form of a wafer presenting two parallel main faces and extending essentially in a main plane away from the first wall portion towards the diametrically opposite wall portion, and wherein said support allows said wafer to expand in all directions, in which the wafer support is formed by an adhesive strip having the same ingredients as the expandable wafer, together with a resin of phenolic or equivalent type, the ingredients being taken in proportions that are suitable for forming a material that is flexible and suitable for adhering both to the expandable wafer and to the wall of the tubular part.

17. A sound insulation assembly according to claim 16, in which the adhesive strip is either T-shaped by being folded onto itself, or else angle-bracket shaped, or else in the form of a plate forming a junction between the expandable wafer and the inside face of the wall of the part.

18. A sound insulation assembly according to claim 17, in which the expandable wafer is either stuck to the foot of the strip, or else is engaged in said foot.

19. A sound insulation assembly according to claim 17, in which adhesive bonding is performed between the wafer and one or two brackets.

20. A sound insulation assembly according to claim 17, in which studs of expandable material consolidate retention of the wafer on the adhesive plate.

21. An acoustic insulation assembly according to claim 1, in which the material suitable for thermally expanding is a compound of a vulcanizable synthetic rubber of the butyl, halogenated butyl, or nitrile type, in which a swelling agent has been added in order to form a filler the quantity of the swelling agent being a function of the desired expansion ratio.

22. A tubular part fitted with at least one sound insulation assembly according to claim 1, the wafer being expanded thermally while applying paint to the part.

* * * * *

UNITED STATES PATENT AND TRADEMARK OFFICE
CERTIFICATE OF CORRECTION

PATENT NO. : 6,988,585 B2 Page 1 of 1
DATED : January 24, 2006
INVENTOR(S) : Mourieras et al.

It is certified that error appears in the above-identified patent and that said Letters Patent is hereby corrected as shown below:

Column 1,
Line 66, after "It comprises a", insert -- piece of material that is thermally expandable to form a --.

Signed and Sealed this

Thirteenth Day of June, 2006

JON W. DUDAS
*Director of the United States Patent and Trademark Office*